United States Patent
Castellani et al.

(10) Patent No.: US 9,626,058 B2
(45) Date of Patent: *Apr. 18, 2017

(54) TOUCH INTERFACE WITH PERSON RECOGNITION

(71) Applicant: International Business Machines Corporation, Armonk, NY (US)

(72) Inventors: Marzia E. Castellani, Zagarolo (IT); Ana Lucia Medina, Twickenham (GB); Roberto Ragusa, Lucera (IT); Aniello Alessandro Rea, Naples (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/919,061

(22) Filed: Oct. 21, 2015

(65) Prior Publication Data

US 2016/0364042 A1    Dec. 15, 2016

Related U.S. Application Data

(63) Continuation of application No. 14/735,202, filed on Jun. 10, 2015.

(51) Int. Cl.
   *G06F 3/033*  (2013.01)
   *G06F 3/041*  (2006.01)
   (Continued)

(52) U.S. Cl.
   CPC .............. *G06F 3/044* (2013.01); *G06F 3/014* (2013.01); *G06F 3/0412* (2013.01); *G06K 9/62* (2013.01);
   (Continued)

(58) Field of Classification Search
   CPC .... G06F 3/014; G06F 3/03545; G06F 3/0383; G06F 3/0386; G06F 3/044; G06F 3/0412; G06K 9/62
   (Continued)

(56) References Cited

U.S. PATENT DOCUMENTS 6,771,161 B1   8/2004  Doi et al.
8,405,612 B2   3/2013  Kruse et al.
(Continued)

OTHER PUBLICATIONS

IBM, List of IBM Patents or Patent Applications Treated as Related, Appendix P, dated Feb. 27, 2016, 2 pages.
(Continued)

*Primary Examiner* — Adam J Snyder
(74) *Attorney, Agent, or Firm* — David Zwick

(57) ABSTRACT

Identifying a tool touching a touchscreen device. A touch location of a tool on a touch-sensitive surface is received from a touchscreen controller. Based on the touch location, one of a plurality of electrodes disposed at locations across the touchscreen is selected and an electric circuit is enabled. The electric circuit includes a signal generator attached to the tool that transmits a modulated identification (ID) signal, a parasitic capacitance path between the signal generator and the selected electrode, a demodulator connected to the selected electrode that receives the ID signal, a resistive layer connected to the demodulator, covering the touch-sensitive surface, and a resistive path through the tool to the signal generator. The demodulator demodulates the modulated ID signal to recover a bit sequence. The tool is identified, based on the recovered bit sequence.

9 Claims, 5 Drawing Sheets

(51) Int. Cl.
*G06F 3/044* (2006.01)
*G06F 3/01* (2006.01)
*G06K 9/62* (2006.01)

(52) U.S. Cl.
CPC .............. *G06F 2203/04104* (2013.01); *G06F 2203/04106* (2013.01)

(58) Field of Classification Search
USPC ........................................ 345/179; 178/19.03
See application file for complete search history.

(56) References Cited

U.S. PATENT DOCUMENTS

| | | | |
|---|---|---|---|
| 8,493,359 B2 | 7/2013 | Wright et al. | |
| 2006/0274920 A1* | 12/2006 | Tochikubo | G06F 21/32 382/124 |
| 2007/0236478 A1 | 10/2007 | Geaghan et al. | |
| 2007/0273670 A1 | 11/2007 | Nordahl | |
| 2008/0238885 A1 | 10/2008 | Zachut et al. | |
| 2010/0085325 A1* | 4/2010 | King-Smith | G06F 3/03545 345/174 |
| 2010/0220070 A1* | 9/2010 | Niwa | G06F 3/011 345/173 |
| 2010/0263031 A1* | 10/2010 | Tsuchiya | G06F 21/32 726/7 |
| 2011/0193776 A1* | 8/2011 | Oda | G06F 3/046 345/157 |
| 2011/0279408 A1 | 11/2011 | Urano et al. | |
| 2012/0068964 A1* | 3/2012 | Wright | G06F 3/03545 345/174 |
| 2012/0105362 A1* | 5/2012 | Kremin | G06F 3/03545 345/174 |
| 2012/0113051 A1* | 5/2012 | Bird | G06F 3/044 345/174 |
| 2013/0106709 A1* | 5/2013 | Simmons | G06F 3/044 345/173 |
| 2013/0207925 A1* | 8/2013 | Ryshtun | G06F 3/0416 345/174 |
| 2013/0257804 A1* | 10/2013 | Vu | G06F 3/044 345/174 |
| 2015/0177868 A1* | 6/2015 | Morein | G06F 3/044 345/174 |
| 2016/0048224 A1* | 2/2016 | Brunet | G06F 3/03545 345/174 |

OTHER PUBLICATIONS

Pending U.S. Appl. No. 14/735,202, filed Jun. 10, 2015, Entitled "Touch Interface With Person Recognition".

Meyer et al., "IdWristbands: IR-based User Identification on Multi-touch Surfaces," ITS' 10, Nov. 7-10, 2010, Saarbrucken, Germany, pp. 277-278.

Vu et al., "Distinguishing Users with Capacitive Touch Communication," MobiCom '12, Aug. 22-26, 2012, Istanbul, Turkey, pp. 1-12.

Vu et al., "Personal Touch-Identification Tokens," Pervasive computing, IEEE Computer Society, vol. 12, Issue 2, pp. 10-13, 2013.

Sandnes et al., "User Identification based on Touch Dynamics," 2012 9th International Conference on Ubiquitous Intelligence and Computing and 9th International Conference on Autonomic and Trusted Computing, IEEE Computer Society, pp. 256-263.

Pending U.S. Appl. No. 14/735,202, filed Jun. 10, 2015, entitled: "Touch Interface With Person Recognition", 26 pages.

* cited by examiner

TOUCH INTERFACE WITH PERSON RECOGNITION

BACKGROUND

The present invention relates generally to the field of human-computer touch interfaces, and more particularly to touch interfaces that allow for identification of users.

A touch interface is a computer pointing technology based on detection of touch. Touch interfaces generally have a surface that acts both as a display and as an input device. The user executes several kinds of gestures, such as tap, drag, and pinch, on the surface, often acting on displayed virtual buttons and other graphical objects. These gestures may then be interpreted and acted upon by the host device.

Multitouch interfaces are touch interfaces that have the ability to detect more than one point of contact with the surface, for example when a pinch gesture or other complex gesture is executed with two or more fingers. Multitouch interfaces may also detect multiple persons simultaneously providing input, for example when simple or complex gestures are executed by multiple persons on a large touch table. However, when multiple persons, either separately or simultaneously, execute gestures on a multitouch interface, there is no rapid, simple, and reliable way to identify which person is providing the input.

SUMMARY

Embodiments of the present invention disclose a system and computer-implemented method for identifying a tool touching a touchscreen device.

The system includes a touch-sensitive surface that generates a signal in response to a touch from a tool touching the surface; a touchscreen controller that receives the signal from the touch-sensitive surface and determines the location of the touch; logic to select, based on the touch location, one of a plurality of electrodes disposed at locations across the touch-sensitive surface; and logic to enable an electric circuit. The electric circuit includes a signal generator attached to the tool that transmits a modulated identification (ID) signal; a parasitic capacitance path between the signal generator and the selected electrode; a demodulator connected to the selected electrode that receives the ID signal; a resistive layer, connected to the demodulator, covering the touch-sensitive surface; and a resistive path through the tool to the signal generator. The demodulator demodulates the modulated ID signal and recovers a bit sequence. The system further includes logic that identifies the tool, based on the recovered bit sequence.

The method includes receiving a touch location of a tool on a touch-sensitive surface from a touchscreen controller; selecting, based on the touch location, one of a plurality of electrodes disposed at locations across the touchscreen; and enabling an electric circuit. The electric circuit includes a signal generator attached to the tool that transmits a modulated identification (ID) signal; a parasitic capacitance path between the signal generator and the selected electrode; a demodulator connected to the selected electrode that receives the ID signal; a resistive layer, connected to the demodulator, covering the touch-sensitive surface; and a resistive path through the tool to the signal generator. The demodulator demodulates the modulated ID signal to recover a bit sequence. The tool is identified, based on the recovered bit sequence.

DETAILED DESCRIPTION

Figure 1:
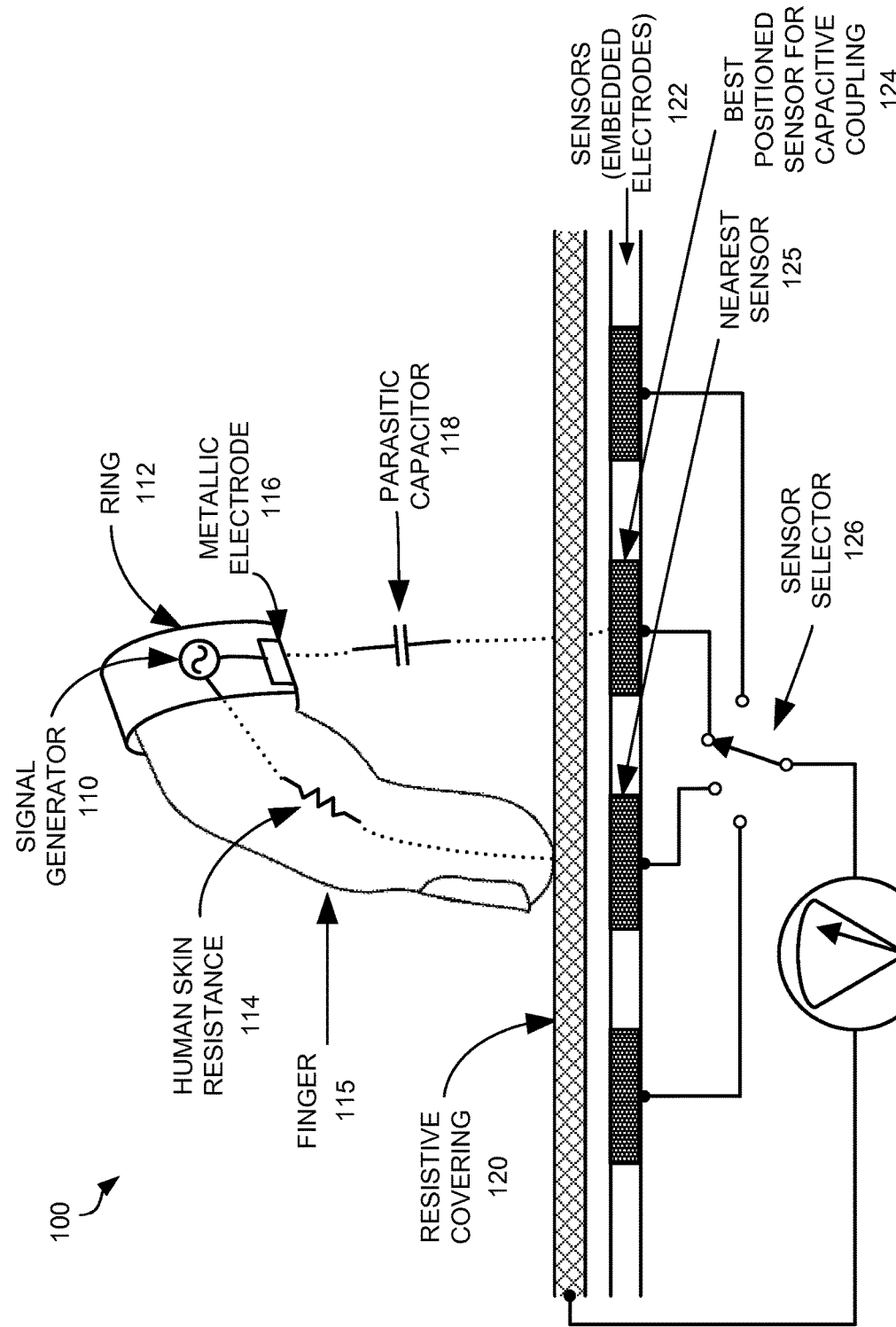
FIG. 1 is a schematic side view of a touchscreen person recognition (TPR) hardware system, in accordance with an embodiment of the present invention.

Embodiments of the present invention are directed generally to touchscreen person recognition (TPR) systems. A modulated identification (ID) signal is generated, for example, by a ring that includes a signal generator and is worn on a finger that touches the touchscreen. Identifying information obtained from the modulated ID signal may be passed from the touchscreen controller to a processor in the device that includes the touchscreen.

Touch interface technologies currently exist for identifying a user executing a touch gesture on a touchscreen. An example is a touch interface with person recognition, or user identification, that employs existing touch hardware to detect an injected signal. For example, a ring worn by a user may simulate a sequence of touch events, which is detected as if the user were tapping a sort of Morse code on the touchscreen. Such approaches may not require hardware modifications, but may suffer from reliability problems and slow user identification speed. The use of a separate person recognition circuit, a robust modulation method such as frequency-shift keying (FSK), and a higher bit rate may result in increased reliability and a higher identification speed.

Touchscreens typically include an integrated touch panel and display screen, and a controller. The touch panel is typically a clear panel with a touch sensitive surface, that is, the surface can detect that certain objects, such as a human finger, have touched its surface, and determine a location on the surface where the touch occurred. The touch panel is typically positioned in front of the display screen so that the touch sensitive surface covers the viewable area of the display screen. Typically, the touch panel registers touches and sends data to the controller. The controller processes the data, determines the location of the touches, and sends information to a driver in the host device. Application programming interfaces (API) to interface with the touchscreen are usually provided with devices that include a touchscreen. For example, an API may specify how an operating system passes touch or gesture messages to an application, which may then update the graphical user interface (GUI), based on these messages. While touchscreens are typically associated with a display device, the term touchscreen may also include touch interfaces that may not be associated with a display, such as a touchpad or digitizer tablet. Certain touch interfaces are able to sense the presence of a finger or other tool hovering closely above the touch device, within a limited range, without actual contact. Such events may also be considered as touch events.

Touchscreen technologies use various methods for sensing touch, including those based on capacitive effects. A capacitive touchscreen panel consists of an insulator such as glass, coated with a thin, transparent conductor, such as indium tin oxide (ITO). A finger touching the surface of the screen results in a distortion of the screen's electrostatic field, measurable as a change in capacitance. Various methods may be used to determine the location of the touch. For example, circuits located at each corner of the touchscreen may measure the decrease in charge. A controller may then calculate, from the relative differences in charge at each corner, where the touch event took place.

Multitouch interfaces commonly employ a variant of capacitive touch technology called projected capacitance, or p-cap. P-cap touchscreens use two layers of conductors, typically made of ITO, separated by an insulator, such as a thin sheet of glass. The conductors in each layer are separate, so that the capacitance of each one can be measured separately. One layer has multiple, parallel conductors, representing an x-axis; the other layer has multiple conductors running at right angles to the conductors in the first layer, representing a y-axis, so the device can sense both an x-coordinate and a y-coordinate, when touched. When the screen is touched, the electrical charge of each layer of conductors at that point is decreased by a small amount. Touchscreen circuits measure this decrease and report it to the controller, which then calculates the coordinates of the touch point. The controller scans the separate conductors in rapid succession, so that all pairs of coordinates are measured many times per second. Because each conductor is checked separately, it is possible to identify multiple, simultaneous touch points.

In various embodiments of the invention, the touch interface may, in addition to determining touch locations, receive a modulated, encoded signal generated by a portable device, such as a ring or electronic bracelet worn by a user, and transmitted via the skin. When the user touches the touchscreen surface, an electrical circuit is closed between a transmitter in the portable device and a receiver near the touched point on the surface. The signal represents an identification (ID) code, which may be different for different transmitting devices. A processor decodes the signal, and another processor in the host device maps the decoded signal to an ID code of a specific user, for example in a multi-user game, or of a role, for example as guest or administrator in a computer system.

The ability to quickly differentiate among users of a touch interface may have various applications, for example:
  Access control: For example, a "guest" bracelet and an "administrator" bracelet, with different capabilities assigned to them. This may also be used as parental control, where some functions are only available with the "adult" bracelet, while other functions are available with any bracelet, or without a bracelet.
  User competition: For example, a game in which one player tries to catch an appearing object before another player does.
  User collaboration: For example, users assigning tasks to themselves by touching on-screen controls.
  Automatic user login: By simply touching the screen a user is recognized. This is similar to biometric identification, except that biometric identification is unique and invariable.

Various signal modulation methods are available for encoding a digital user identification. For example, frequency modulation is the encoding of information in a carrier wave by varying the instantaneous frequency of the wave. Digital data can be encoded and transmitted via a carrier wave by shifting the carrier's frequency among a predefined set of frequencies, a technique known as frequency-shift keying (FSK). The simplest FSK is binary FSK (BFSK), which uses a pair of discrete frequencies to transmit binary information, consisting of strings of 0s and 1s. A receiver may then recover the original signal through a process called demodulation. The demodulation of a BFSK signal can be done efficiently, for example, by the Goertzel algorithm, a special form of the discrete Fourier transform, which efficiently computes a small number of selected frequency components of a signal.

As a demodulated bit sequence may contain bit errors, for example, due to a weak signal, data validation may be used to confirm the integrity and completeness of the digital information it contains. A common method of data validation for digital data is the inclusion of a checksum, a quantity computed from the data according to a known algorithm. If the computed checksum for a data input matches the stored value of a previously computed checksum, there is a very high probability that the data has not been altered or corrupted.

In electrical circuits, parasitic capacitance is an unavoidable capacitance that exists between the parts of an electronic component or circuit due to their proximity. Circuit elements such as inductors, diodes, and transistors all have internal capacitance, which can cause their behavior to depart from that of ideal circuit elements. In addition, there is always non-zero capacitance between any two closely-spaced conductors, such as wires or printed circuit board traces. Parasitic capacitance is usually unwanted. However, in certain embodiments of the present invention it may represent an element of a TPR circuit and be a source of capacitive coupling, the transfer of energy within an electrical network by means of the capacitance between circuit elements.

FIG. 1 is a schematic side view of a TPR hardware system 100, in accordance with an embodiment of the invention. TPR hardware system 100 includes ring 112, containing signal generator 110 and metallic electrode 116; resistive layer 120; TPR sensor array 122, including, for example, TPR sensors 124 and 125; TPR sensor selector 126; and signal demodulator 128. Also illustrated are various elements of a TPR circuit (FIG. 2), described below. In various embodiments of the present invention, TPR hardware system 100 may be physically integrated into a touchscreen, while not contributing to the touch location functionally of the touchscreen.

In certain embodiments of the invention, signal generator 110 and metallic electrode 116 may be included in a user-wearable device such as ring 112. Ring 112 may be worn on finger 115, which represents a tool that touches the touch sensitive surface of the touchscreen.

Signal generator 110 may use FSK digital modulation to encode and transmit a unique, predefined bit sequence used for user identification. Signal generator 110 may be, for example, a small microcontroller chip that provides the data to be transmitted. Signal generator 110 may also include other common components, not shown, of a signal generating device, such as a battery and an amplifier. An output node of signal generator 110 may be connected to metallic electrode 116 on ring 112. Another output node of signal generator 110 may be connected to the internal part of ring 112, in direct contact with the skin.

In certain embodiments of the invention, resistive layer 120 may cover the entire touchscreen, but is independent of the touchscreen touch location hardware. Resistive layer 120 may be, for example, a thin plastic layer coated with a resistive material such as ITO, or a resistive material such as ITO applied directly to a glass substrate.

TPR sensor array 122 may be a set of electrodes, such as TPR sensors 124 and 125, embedded in the touchscreen and disposed in rows across the touchscreen. For example, the electrodes may consist of ITO deposited as a thin film or thin electrical wires, laid out in a transparent grid.

Figure 2:
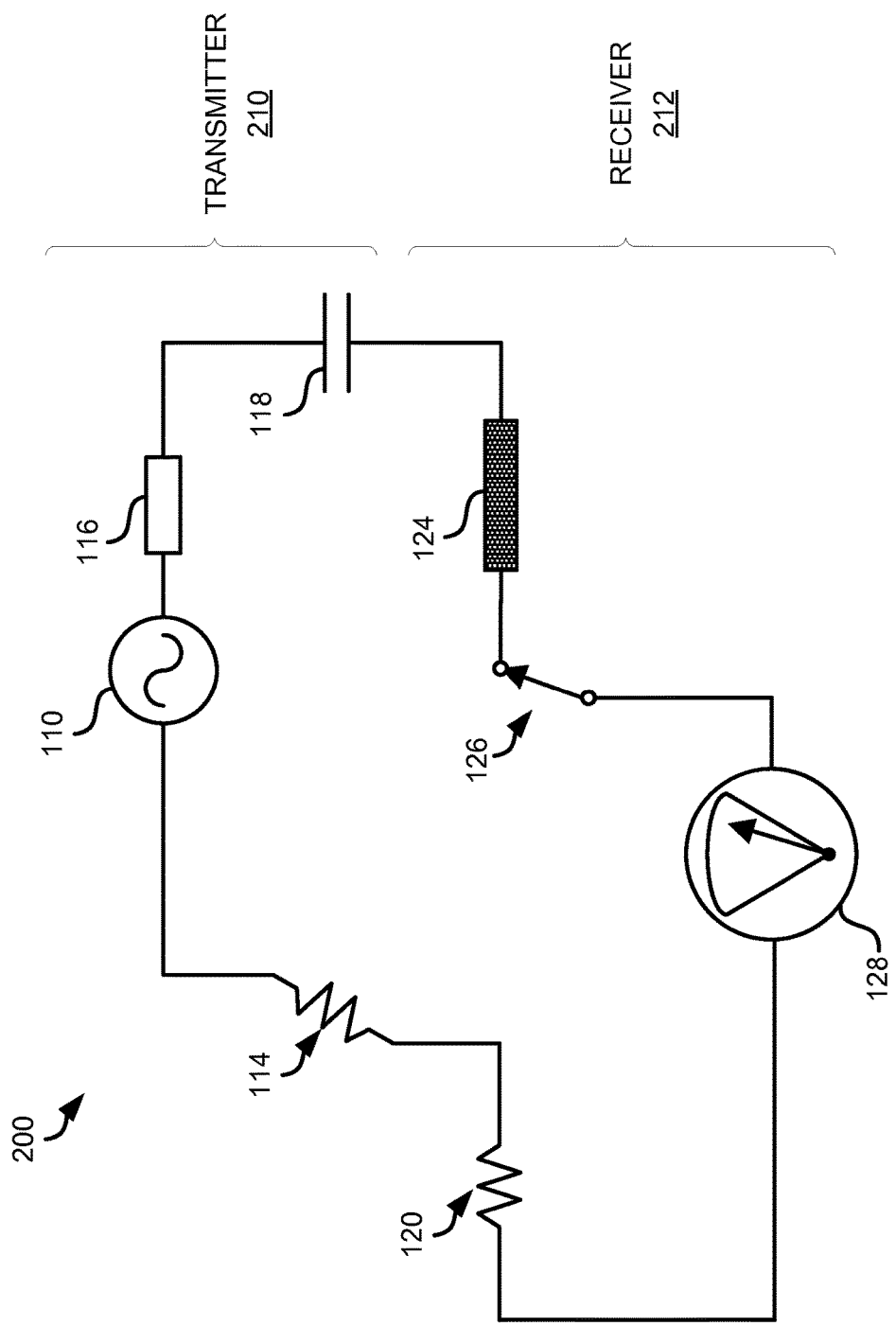
FIG. 2 is a circuit diagram of a TPR circuit, in accordance with an embodiment of the present invention.
Figure 3:
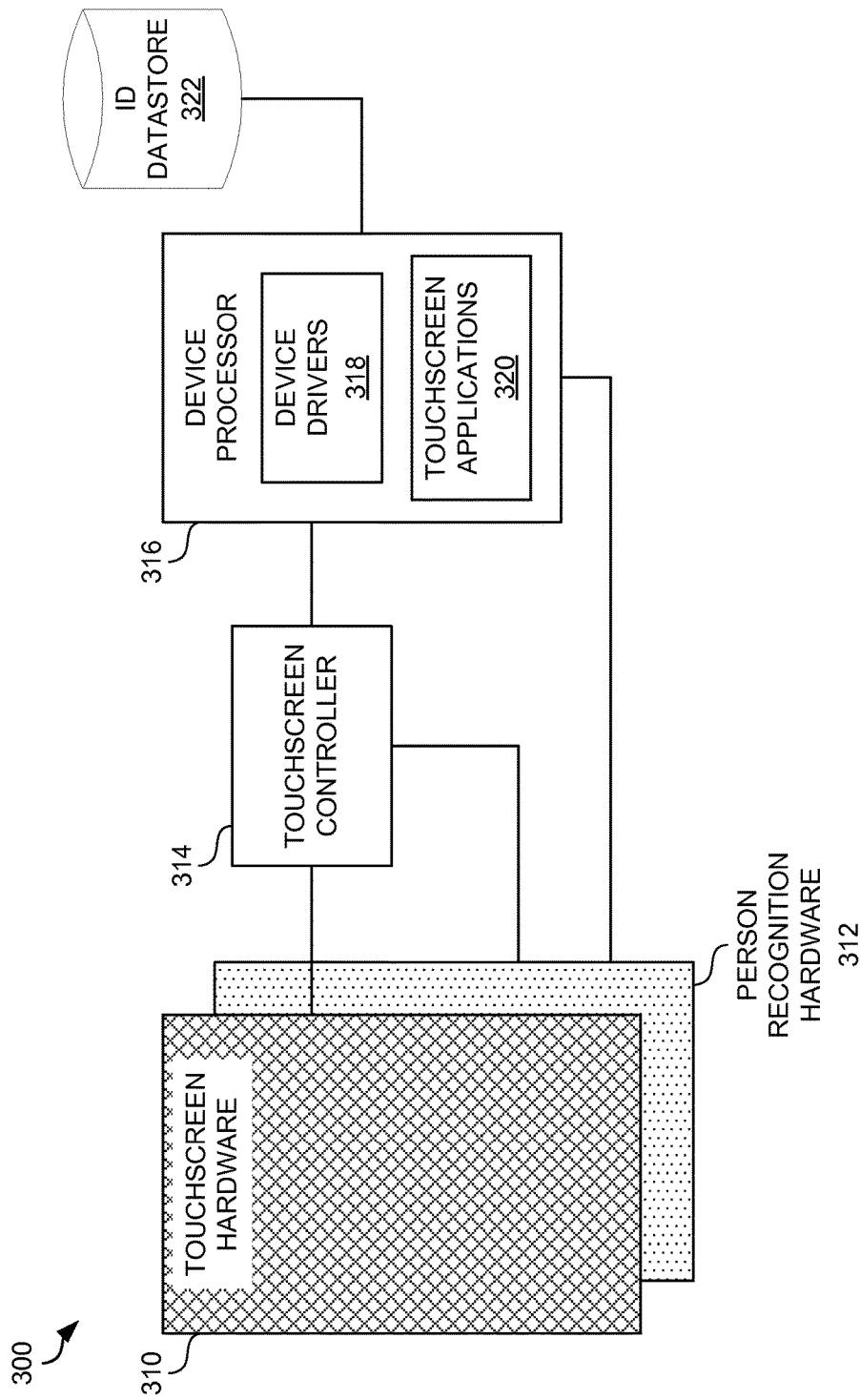
FIG. 3 is a block diagram of a TPR system, in accordance with an embodiment of the present invention.

TPR sensor selector 126 represents a multi-position switch or mux, which may be operated, for example, by touchscreen controller 314 or a device driver 318 (FIG. 3). TPR sensor selector 126 operates generally to complete TPR circuit 200 (FIG. 2) by selecting a sensor of TPR sensor array 122. In an embodiment of the invention, the sensor of TPR sensor array 122 selected may initially be one closest to the touch location detected by the touchscreen, for example TPR sensor 125. If the resulting demodulated signal is not valid, i.e., contains bit errors or is otherwise corrupted, TPR sensor selector 126 may be directed by, for example, device processor 316 to select an alternative TPR sensor, for example TPR sensor 124, and so on, until a valid bit sequence is received or all TPR sensors have been tried.

Signal demodulator 128 receives a modulated signal that includes an encoded ID sequence, transmitted by signal generator 110. Signal demodulator 128 applies an appropriate algorithm to demodulate the signal and decode the ID sequence. For example, if the signal has been encoded using BFSK modulation, then signal demodulator 128 may apply the Goertzel algorithm to recover the ID sequence.

FIG. 2 is a circuit diagram representation of the TPR hardware system 100 of FIG. 1, in accordance with an embodiment of the invention. TPR circuit 200 includes transmitter portion 210 and receiver portion 212. Transmitter portion 210 includes signal generator 110 (FIG. 1), metallic electrode 116, attached to a user-wearable device, such as ring 115, in contact with the skin of finger 115; resistance 114 of the skin; and parasitic capacitor 118, created, for example, by the proximity of metallic electrode 116 to TPR sensor 124, which may be embedded in the touchscreen. Receiver portion 212 includes resistive layer 120, which may cover the touchscreen; TPR sensor 124; TPR sensor selector 126; and signal demodulator 128.

FIG. 3 depicts a functional block diagram of a TPR system 300, in accordance with an embodiment of the present invention. TPR system 300 includes touchscreen hardware 310, person recognition hardware 312, touchscreen controller 314, device processor 316, and ID datastore 322. Device processor 316 may further include device drivers 318 and touchscreen applications 320.

Touchscreen hardware 310 represents any touchscreen device, for example a smart phone touchscreen, in accordance with touchscreen 526 (FIG. 5), capable of sensing a touch and transmitting data to touchscreen controller 314.

Touchscreen controller 314 represents a processor that receives data from touchscreen hardware 310 and provides touch location information to device drivers 318, which may process the information, for example, to determine whether certain simple or complex gestures have been executed and make this information available to touchscreen applications 320. Touchscreen controller 314 may be integrated in touchscreen 526 or its functions may be performed by a processor 510 of computing device 500.

Person recognition hardware 312 represents receiver portion 212 of TPR circuit 200 (FIG. 2). In accordance with various embodiments of the invention, person recognition hardware 312 may be superimposed on or physically integrated with touchscreen hardware 310. In various embodiments of the invention, person recognition hardware 312 is functionally distinct from touchscreen hardware 310, except for receiving touch location information.

ID datastore 322 represents a store of ID bit sequences which software drivers 318 and/or touchscreen applications 320 may compare to bit sequences recovered and validated by signal demodulator 128 (FIG. 1), for the purpose of user identification.

Figure 4:
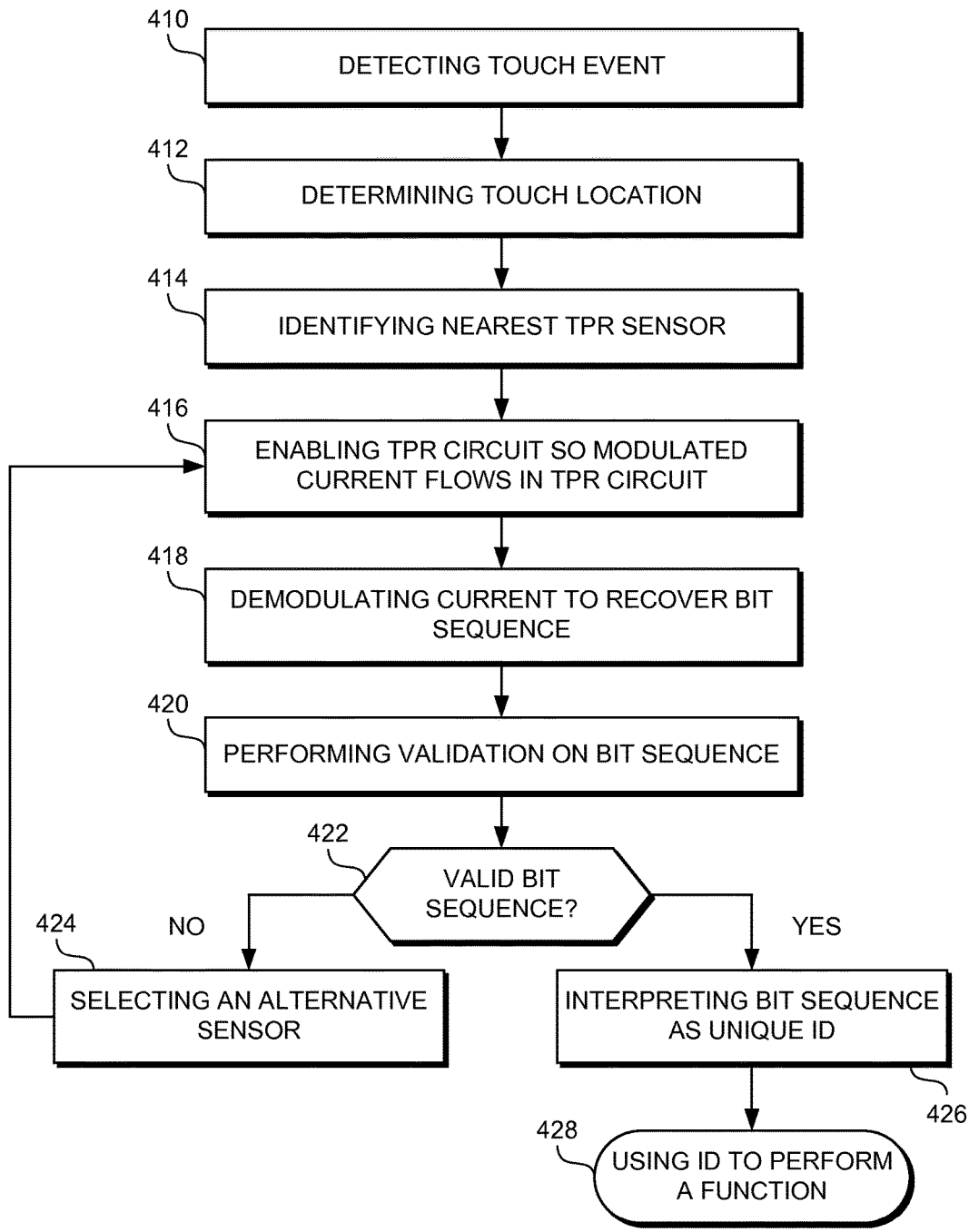
FIG. 4 is a flowchart depicting operational steps of a TPR system, in accordance with an embodiment of the present invention.

FIG. 4 is a flowchart depicting operational steps of TPR system 100 in accordance with an exemplary embodiment of the invention. A touchscreen 526 (FIG. 5) detects a touch event (step 410). For example, touchscreen 526 may be touched by finger 115 (FIG. 1). Touchscreen controller 314 (FIG. 3) receives a signal from the touchscreen hardware 310, which determines the touch location (step 412). The touch location is transmitted to the person recognition hardware 312, which identifies a TPR sensor 125 nearest to the touch location (step 414). TPR sensor selector 126 enables TPR circuit 200 by selecting TPR sensor 125, and a modulated current generated by signal generator 110 in ring 112, containing an encoded bit sequence, flows in TPR circuit 200 (step 416). Signal demodulator 128 in touchscreen controller 312 demodulates the modulated signal to recover the bit sequence (step 418). The bit sequence may be validated, for example, via a checksum by device processor 316 (step 420). If the recovered bit sequence is not valid (decision step 422, "NO" branch), TPR sensor selector 126 may receive a signal from device processor 316 directing it to select an alternative sensor for the TPR circuit, for example TPR sensor 124 (step 424). The recovered bit sequence may be invalid if, for example, the modulated signal is weak because the TPR sensor 125 nearest to finger 115 is not the TPR sensor 124 nearest to ring 112. If the recovered bit sequence is valid (decision step 422, "YES" branch), it is interpreted as a unique ID sequence, for example via a table lookup in ID datastore 322 (step 426). The ID sequence may then be used to perform a function, for example user authentication (step 428).

In certain embodiments of the invention, if signal demodulator 128 does not detect a signal, for example, using the first selected TPR sensor 125 (step 418), indicating that no transmitter portion 210 is present, then the remaining steps shown in FIG. 4, in particular the process of selecting alternative TPR sensors, may be skipped, without a successful user identification.

Figure 5:
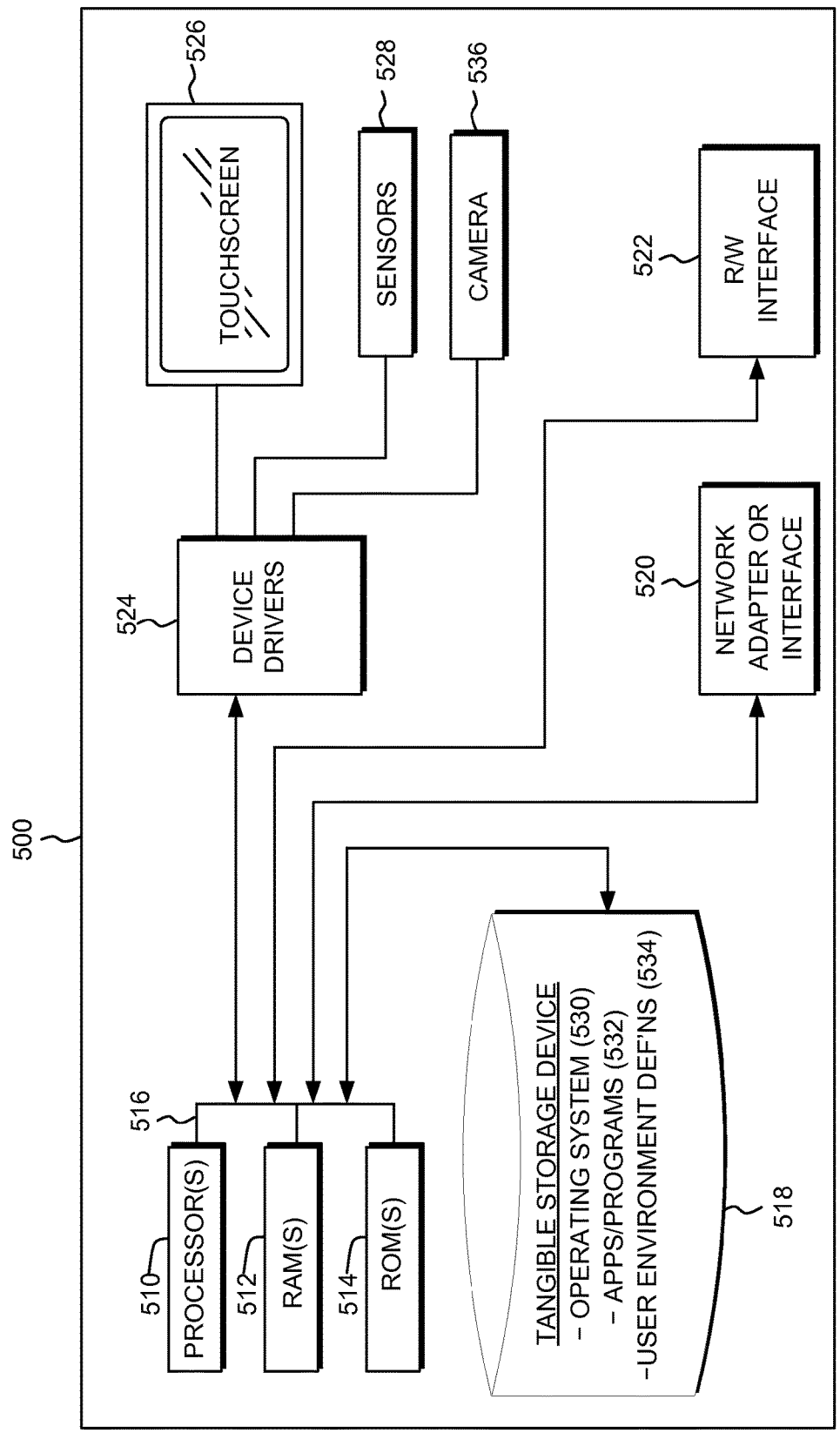
FIG. 5 is a functional block diagram illustrating a data processing environment, in accordance with an embodiment of the present invention.

FIG. 5 is a block diagram of components of a computing device 500, in accordance with an embodiment of the present invention. In an exemplary embodiment, computing device 500 includes one or more processors 510, one or more computer-readable RAMs 512, one or more computer-readable ROMs 514, and one or more computer-readable tangible storage devices 518 on one or more buses 516. One or more operating systems 530, one or more apps or programs 532, such as touchscreen applications 320, and one or more user environment definitions 534 are stored on the one or more computer-readable tangible storage devices 518 for execution by one or more of the processors 510 via one or more of the RAMs 512 (which typically include cache memory). In the illustrated embodiment, each of the computer-readable tangible storage devices 518, for example, ID datastore 322, is a semiconductor storage device such as ROM 514, EPROM, flash memory or any other computer-readable tangible storage device that can store a computer program and digital information. Alternatively, each of the computer-readable tangible storage devices 518 is a magnetic disk storage device of an internal hard drive.

Computing device 500 also includes a read/write (R/W) interface 522, for example, a USB port, to read from and write to external computing devices or one or more portable computer-readable tangible storage devices such as a CD-ROM, DVD, memory stick, magnetic disk, optical disk or semiconductor storage device. The apps and programs 532 and the user environment definitions 534 can be stored on the external computing devices or one or more of the portable computer-readable tangible storage devices, read via the R/W interface 522 and loaded onto the computer-readable tangible storage device 518.

Computing device 500 also includes a network adapter or interface 520, such as a TCP/IP adapter card or wireless communication adapter (such as a 4G wireless communication adapter using OFDMA technology). The apps and programs 532 and the user environment definitions 534 can be downloaded to computing device 500 from an external computer or external storage device via a network (for example, the Internet, a local area network, a wide area network, or a wireless network) and network adapter or interface 520. From the network adapter or interface 520, the apps and programs 532 and the user environment definitions 534 are loaded into computer-readable tangible storage device 518. The network may comprise copper wires, optical fibers, wireless transmission, routers, firewalls, switches, gateway computers and/or edge servers.

Computing device 500 also includes a touchscreen 526, a camera 536, sensors 528, for example, touchscreen sensors and magnetically sensitive circuits, and device drivers 524, such as software drivers 318, to interface to touchscreen 526 for imaging, to sensors 528 for pressure sensing of alphanumeric character entry and user selections and for detecting magnetic flux and polarity. The device drivers 524, R/W interface 522 and network adapter or interface 520 comprise hardware and software (stored in computer-readable tangible storage device 518 and/or ROM 514). In accordance with an embodiment of the invention, computing device 500 may also include person recognition hardware 312.

It should be appreciated that FIG. 5 provides only an illustration of one implementation and does not imply any limitations with regard to the environments in which different embodiments may be implemented. Many modifications to the depicted environment may be made.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and program product have been disclosed for a touch interface with person recognition. However, numerous modifications and substitutions can be made without deviating from the scope of the present invention. Therefore, the present invention has been disclosed by way of example and not limitation.

What is claimed is:

1. A method for identifying a tool touching a touchscreen device, the method comprising:
    providing touch detection circuitry, including:
        a touch-sensitive surface operated to generate a signal in response to a tool touching the surface; and
        a touchscreen controller operated to receive the signal from the touch-sensitive surface and determine a location of the touch;
    providing tool identification circuitry, including:
        a signal generator attached to the tool;
        a resistive path through the tool that couples the signal generator to a resistive layer covering the touch-sensitive surface;
        a demodulator coupled to the resistive layer;
        a plurality of electrodes disposed at locations across the touch-sensitive surface;
        an electrode selector switch coupled to the plurality of electrodes and the demodulator; and
        a parasitic capacitance path that couples the signal generator to one or more of the plurality of electrodes;
    determining, by the touch detection circuitry, a touch location of a tool touching the touch-sensitive surface;
    selecting, by the electrode selector switch, one of the plurality of electrodes nearest to the touch location, whereby a tool identification circuit is completed that includes:
        the signal generator attached to the tool;
        a resistive path through the tool coupling the signal generator to the resistive layer;
        the demodulator coupled to the resistive layer;
        the selected electrode;
        the electrode selector switch coupled to selected electrode and the demodulator; and
        a parasitic capacitance path coupling the signal generator to the selected electrode;
    transmitting, by the signal generator, over the tool identification circuit, a modulated identification (ID) signal;
    receiving, by the demodulator, over the tool identification circuit, the modulated ID signal;
    demodulating, by the demodulator, the modulated ID signal to recover a bit sequence; and
    identifying, by one or more processors, the tool, based on the recovered bit sequence.

2. A method in accordance with claim 1, wherein selecting, by the electrode selector switch, one of the plurality of electrodes nearest to the touch location, whereby a tool identification circuit is completed, comprises:
    selecting a first electrode nearest to the touch location;
    in response to determining that the recovered bit sequence is not valid, selecting an electrode at an alternative location to include in completing the tool identification circuit.

3. A method in accordance with claim 1, wherein the tool is a finger, the signal generator is included in a user-wearable device, and the resistive path includes skin of the finger.

4. A method in accordance with claim 3, wherein the user-wearable device is one of a ring or a bracelet.

5. A method in accordance with claim 1, wherein the electrode selector switch is a mux.

6. A method in accordance with claim 1, wherein the plurality of electrodes are disposed at locations across the touch-sensitive surface in parallel rows.

7. A method in accordance with claim 1, wherein the ID signal is modulated using frequency-shift keying.

8. A method in accordance with claim 7, wherein frequency-shift keying comprises binary frequency-shift keying.

9. A method in accordance with claim 8, wherein demodulating the modulated ID signal comprises using a Goertzel algorithm.

* * * * *